Figure 1:
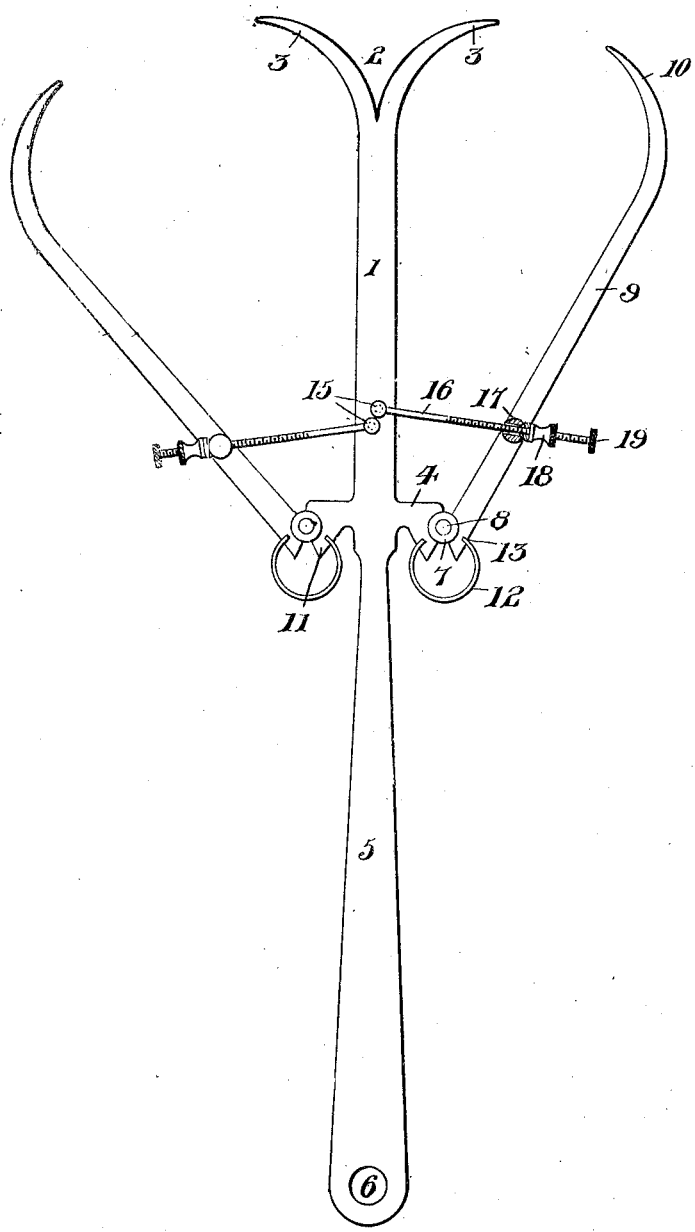

F. BAUER.
CALIPERS.
APPLICATION FILED MAR. 29, 1912.

1,058,403.

Patented Apr. 8, 1913.

WITNESSES

INVENTOR
F. Bauer
BY
ATTORNEYS

UNITED STATES PATENT OFFICE.

FERDINAND BAUER, OF LEETSDALE, PENNSYLVANIA.

CALIPERS.

1,058,403.   Specification of Letters Patent.   Patented Apr. 8, 1913.

Application filed March 29, 1912.   Serial No. 687,150.

*To all whom it may concern:*

Be it known that I, FERDINAND BAUER, a subject of the Emperor of Austria-Hungary, residing at Leetsdale, in the county of Allegheny and State of Pennsylvania, have invented certain new and useful Improvements in Calipers, of which the following is a specification, reference being had therein to the accompanying drawing.

This invention relates to calipers, and the objects of my invention are, first, to provide a double pair of calipers that can be easily and quickly adjusted; second, to provide a pair of calipers having novel adjustable arms that are retained in a normal open position, and third, to provide a pair of calipers that are inexpensive to manufacture, durable, and highly efficient for the purposes for which they are intended.

I attain the above objects by a mechanical construction that will be hereinafter specifically described and then claimed, and reference will now be had to the drawing, wherein:—

Figure 2:
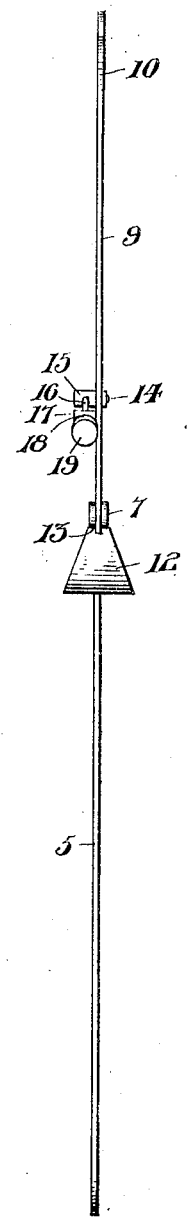

Figure 1 is a front elevation of calipers in accordance with this invention, and Fig. 2 is a side elevation of the same.

The reference numeral 1 denotes a center arm having the outer end thereof bifurcated, as at 2 and the bifurcated portions bent outwardly and tapered to provide stationary points 3. The inner end of the center arm 1 has side projections 4 and a handle 5, the end of said handle having an opening 6 whereby the caliper can be suspended from a hook or other support.

The side projections 4 are provided with apertured ears 7 and pivotally mounted between said ears by pins 8 are the inner ends of adjustable side arms 9, said side arms having the outer ends thereof tapered and bent to provide points 10 adapted to confront the points 3 of the center arm 1.

The side projections 4 are provided with depending portions 11 and mounted in said depening portions are the inner ends of flat retractile springs 12, the outer ends of said springs being mounted in the inner ends of the side arms 9, as at 13. The retractile springs 12 are of a greater width intermediate the ends than at the ends, whereby the springs will have a greater degree of tension than if the springs were as narrow as the ends thereof.

Pivotally connected to one side of the center arm 1 by pins 14 are the barrels 15 of screws 16. The screws 16 extend through apertured revoluble bearings 17 carried by the side arms 9 and said screws are provided with nuts 18 engaging in the bearings 17. The screws 16 are rotatably supported by the barrels 15 and the outer ends of the screws 16 have knurled heads 19, whereby the screws can be rotated to adjust the side arms 9. The nuts 18 are knurled and said nuts can be rotated to adjust the side arms 9 relatively to the center arm 1. The tension of the springs 12 is sufficient to retain the side arms normally in engagement with the nuts 18, consequently the side arms 9 will be held in an open position with respect to the side arms 1.

The caliper is employed for ascertaining the diameter of a pipe or structure by placing the points 3 and 10 in engagement with the surface of the pipe or structure. The object of a double caliper is that a diameter can be ascertained by one set of arms and the diameter maintained by the calipers for future use, while the other set of arms can be used without interfering with the other arms.

What I claim is:—

Calipers comprising a center arm having the forward end thereof formed with oppositely disposed curved projecting points, oppositely disposed and right angularly extending projections integral with said arm intermediate its ends, each of said projections having its rear edge formed with a rearwardly extending triangular portion, each of said projections having its outer terminus provided with a pair of apertured ears projecting laterally therefrom, adjustable side arms having their rear ends pivotally connected to said apertured ears and their forward ends curving inwardly, said arms having beveled inner termini opposing the outer edges of said triangular portions, bow-shaped springs gradually increasing in width from each end toward the center, each connected at one end to the inner edge of a triangular portion and having its other end connected to the outer edge of one of said arms in proximity to the beveled inner terminus thereof, and adjusting means pivotally connected to said center arm forwardly of said projections and further connected to said adjustable arms.

In testimony whereof I affix my signature in the presence of two witnesses.

FERDINAND BAUER.

Witnesses:
WANDA M. KULESZA,
MARGARET M. COLLEY.